United States Patent
Wang et al.

(10) Patent No.: US 10,163,038 B2
(45) Date of Patent: Dec. 25, 2018

(54) ERROR DETECTION IN RECOGNITION DATA

(71) Applicant: SAP SE, Walldorf (DE)

(72) Inventors: Ke Wang, Nanjing (CN); Yinling Ni, Shanghai (CN); Ling Chen, Shanghai (CN); Ye Jin, Shanghai (CN); Qiwei Zhang, Shanghai (CN); Jing Liu, Nanjing (CN); Xin Li, Nanjing (CN); Chao Yu, Nanjing (CN)

(73) Assignee: SAP SE, Walldorf (DE)

( * ) Notice: Subject to any disclaimer, the term of this patent is extended or adjusted under 35 U.S.C. 154(b) by 232 days.

(21) Appl. No.: 14/998,180

(22) Filed: Dec. 24, 2015

(65) Prior Publication Data

US 2017/0185868 A1   Jun. 29, 2017

(51) Int. Cl.
| | | |
|---|---|---|
| *G06K 9/00* | (2006.01) |
| *G06K 9/62* | (2006.01) |
| *G06K 9/32* | (2006.01) |
| *G06F 17/30* | (2006.01) |
| *G06N 99/00* | (2010.01) |
| *G06N 7/00* | (2006.01) |

(52) U.S. Cl.
CPC ..... *G06K 9/6262* (2013.01); *G06F 17/30247* (2013.01); *G06K 9/325* (2013.01); *G06K 9/6256* (2013.01); *G06N 7/005* (2013.01); *G06N 99/005* (2013.01); *G06K 2209/15* (2013.01)

(58) Field of Classification Search
CPC .... G06K 9/6262; G06K 9/6256; G06K 9/325; G06K 2209/15; G06N 7/005; G06N 99/005; G06F 17/30247

USPC .......................................................... 382/105
See application file for complete search history.

(56) References Cited

U.S. PATENT DOCUMENTS

| | | | |
|---|---|---|---|
| 7,900,151 B2 | 3/2011 | Gebhard et al. | |
| 8,457,408 B2 | 6/2013 | Challa | |
| 8,953,890 B2 | 2/2015 | Yassin | |
| 9,082,038 B2 | 7/2015 | Kozitsky et al. | |
| 2013/0216101 A1 | 8/2013 | Wu et al. | |
| 2013/0259314 A1* | 10/2013 | Kozitsky .............. | G06K 9/3258 382/105 |
| 2013/0272580 A1* | 10/2013 | Karel .................. | G08G 1/0175 382/105 |
| 2014/0328518 A1* | 11/2014 | Kozitsky .............. | G06K 9/2018 382/105 |
| 2014/0355836 A1* | 12/2014 | Kozitsky .............. | G06K 9/3258 382/105 |

FOREIGN PATENT DOCUMENTS

JP       2013200845 A  * 10/2013  ............. G07B 15/06

* cited by examiner

*Primary Examiner* — Andrew Moyer
(74) *Attorney, Agent, or Firm* — Jones Day (57) ABSTRACT

Described herein is a descriptive framework to facilitate error detection in recognition data. In accordance with one aspect of the framework, at least one erroneous record is detected in a first set of recognition data. The framework may determine a correction of a first recognized identifier in the erroneous record by searching a second set of recognition data for a matching record with a second recognized identifier substantially similar to the first recognized identifier. A report may then be generated to present the detected erroneous record and the determined correction.

8 Claims, 9 Drawing Sheets

$Abs(SecondsBetween(F\_LPR.captureTime, M\_LPR.captureTime)) < \delta$  302

$DistanceOf(F\_LPR.captureLocation, M\_LPR.captureLocation) < \varepsilon$  304

$DiffChars(F\_LPR.plateNum, M\_LPR.plateNum) = 1$  306

$Count(Distinct(M\_LPR.plateNum)) = 1$  308

$\delta$: Threshold of difference between the capture time between falsely recognized LPR and matching LPR nearby
$\varepsilon$: Threshold of distance between the locations between falsely recognized LPR and matching LPR nearby

Fig. 3a $Abs(SecondsBetween(LPR.captureTime, RFID.captureTime)) < \delta$  312

$DistanceOf(LPR.captureLocation, RFID.captureLocation) < \varepsilon$  314

$\dfrac{DiffChars(LPR.plateNum, RFID.plateNum)}{Max(Length(LPR.plateNum), Length(RFID.plateNum))} > 0$  316

$\dfrac{DiffChars(LPR.plateNum, RFID.plateNum)}{Max(Length(LPR.plateNum), Length(RFID.plateNum))} < 0.5$  318

$\delta$: Threshold of difference between the capture time between LPR and RFID records
$\varepsilon$: Threshold of distance between the locations of LPR and RFID records

Fig. 3b

|  |  | RECOGNIZED |  |  |  |  |  |  |  |  |
|---|---|---|---|---|---|---|---|---|---|---|
|  |  | 苏 | 新 |  | 鹰 | A | B |  | Z | O |  | ? | 5 |
| TRUTH | 苏 | 231 | 8 |  | 17 | 0 | 0 |  | 0 | 0 |  | 0 | 0 |
|  | 新 | 12 | 119 |  | 37 | 0 | 0 |  | 0 | 0 |  | 0 | 0 |
|  |  |  |  | - |  |  |  |  |  |  |  |  |  |
|  | 鹰 | 3 | 29 |  | 79 | 0 | 0 |  | 0 | 0 |  | 0 | 0 |
|  | A | 0 | 0 |  | 0 | 456 | 13 |  | 2 | 5 |  | 9 | 3 |
|  | B | 0 | 0 |  | 0 | 24 | 376 |  |  |  |  | 201 | 23 |
|  |  |  |  |  |  |  |  |  |  |  |  |  |  |
|  | Z | 0 | 0 |  | 0 | 15 | 14 |  | 231 | 1 |  | 0 | 2 |
|  | O | 0 | 0 |  | 0 | 31 | 2 |  | 0 | 155 |  | 8 | 3 |
|  |  |  |  |  |  |  |  |  |  |  |  |  |  |
|  | ? | 0 | 0 |  | 0 | 6 | 179 |  | 0 | 8 |  | 391 | 33 |
|  | 5 | 0 | 0 |  | 0 | 2 | 5 |  | 1 | 7 |  | 21 | 199 |

ERROR DETECTION IN RECOGNITION DATA

TECHNICAL FIELD

The present disclosure relates generally to computer systems, and more specifically, to a framework for facilitating error detection in recognition data.

BACKGROUND

License plate recognition (LPR), also known as automatic number plate recognition (ANPR), is a mass surveillance method that performs optical character recognition on images to read vehicle license plates that display registration identifiers to uniquely identify the vehicles. This feature is becoming increasingly important in modern intelligent transportation systems. It is widely adopted for monitoring road network traffic flows, controlling moving assets, tracking stolen vehicles and identifying dangerous drivers.

At its core, LPR relies on an image processing algorithm to automatically recognize the acquired license plate image and identify the corresponding metadata (e.g., license plate number or registration identifier). However, even the most advanced LPR technique nowadays cannot guarantee 100% accuracy in recognizing vehicle license plates (less than 60% accuracy in some extreme cases). Incorrect LPR may be the result of inherent algorithm limitations, bad weather conditions, poor illumination, too-fast passing speed, blocking obstacles or LPR sensor malfunctioning. Incorrect LPRs may mislead tracking of a suspicious vehicle, which leads to invalid or untrustworthy recommendations and analysis results for higher level applications.

It is of particular interest to an LPR sensor operator to track down LPR sensors that constantly produce faulty results, which indicate that the sensor is malfunctioning and factory maintenance may be necessary. In such a scenario, all LPR records (e.g., millions of records) from all sensors are typically manually searched in order to find the sensors that are probably malfunctioning or to determine the cause of the fault. Currently, there is no better way to pick out incorrect LPR records other than manually going through all data records of interest. Manual detection of incorrect LPRs is extremely costly and problematic, particularly with the dramatic increase in the amount of data records in many city-wide systems that typically produce millions of records from hundreds of sensors daily.

Therefore, there is a need for an improved framework that addresses the above-mentioned challenges.

SUMMARY

A framework for facilitating error detection in recognition data is described herein. In accordance with one aspect of the framework, at least one erroneous record is detected in a first set of recognition data. The framework may determine a correction of a first recognized identifier in the erroneous record by searching a second set of recognition data for a matching record with a second recognized identifier substantially similar to the first recognized identifier. A report may then be generated to present the detected erroneous record and the determined correction.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

The present framework provides a systematic and automatic approach to efficiently and effectively identify recognition errors from a large amount (e.g., millions) of recognition data. One aspect of the framework described herein facilitates automatic detection and correction of incorrectly recognized data records. The detection results may be used to identify malfunctioning sensors that acquired those erroneous data records. The framework may make use of recognition data acquired not only by one sensor, but by a set of nearby sensors, so as to improve accuracy of error detection results. Additionally, the framework may automatically classify the failure of sensors by analyzing error distribution patterns.

Implementations of the present framework are applicable to any city or region to facilitate, for example, LPR data operators and users in detecting erroneous recognition instances, monitor LPR sensors' operation statuses, identify causes of failure and provide suggestions for correction. The framework only needs to process structured data without images, which makes the whole process more resource efficient and provides a higher detection rate. As a result, suggestions for sensor maintenance are highly accurate. Manpower costs are greatly reduced, since there is no need to manually review massive amounts of recognition data. These and other advantages and features will be described in more detailed herein.

It should be appreciated that the framework described herein may be implemented as a method, a computer-controlled apparatus, a computer process, a computing system, or as an article of manufacture such as a computer-usable medium. For illustration purposes, the present framework may be described in the context of license plate recognition. It should be appreciated, however, that the present framework may also be applied in processing other types of recognition data that identifies other types of objects of interest.

Figure 1:
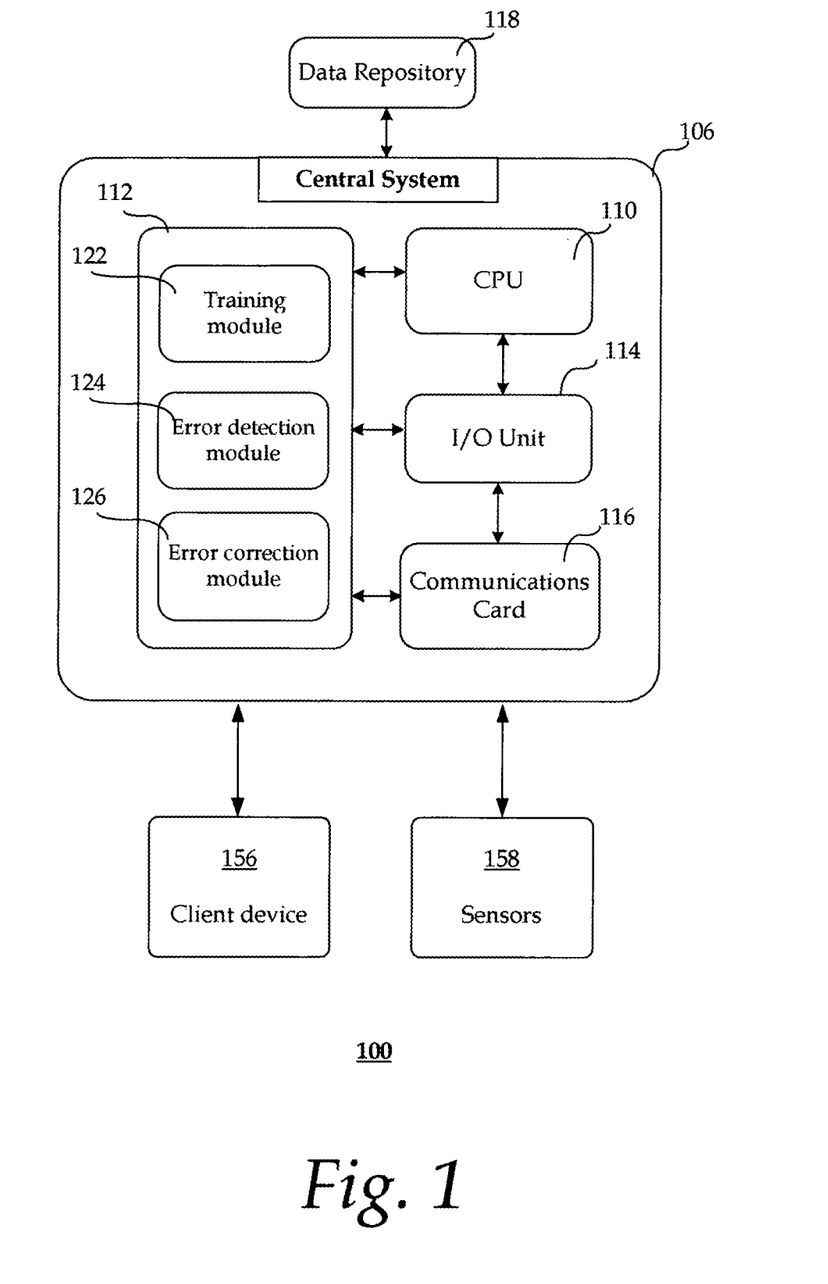
FIG. 1 is a block diagram illustrating an exemplary architecture.

FIG. 1 is a block diagram illustrating an exemplary architecture 100 that may be used to implement the framework described herein. Generally, architecture 100 may include a central computer system 106, a client device 156, sensors 158 and a data repository 118. Central computer system 106 may include a central processing unit (CPU) 110, an input/output (I/O) unit 114, a memory module 112 and a communications card or device 116 (e.g., modem and/or network adapter) for exchanging data with a network (e.g., local area network (LAN) or a wide area network (WAN)). It should be appreciated that the different components and sub-components of the computer system 106 may be located on different machines or systems.

Central computer system 106 may be communicatively coupled to one or more other computer systems or devices via the network. For instance, computer system 106 may further be communicatively coupled to one or more data repositories 118. Alternatively, data repository 118 may be implemented within computer system 106. Data repository 118 may be, for example, any database (e.g., relational database, in-memory database, etc.), an entity (e.g., set of related records), or a data set included in a database. In some implementations, data repository 118 serves to store recognition data (e.g., LPR records), identification data (e.g., RFID records), and so forth. Data repository 118 may include a high efficiency database with low seek time to enable the central system 106 to perform substantially in real time.

In some implementations, an in-memory database is implemented as the data repository 118. In-memory databases allow seamless access to and propagation of high volumes of data in real time. Parallel processing may further be achieved by using a multicore processor 110 in conjunction with the in-memory database 118. The in-memory database 118 is a database management system that relies primarily on a system's main memory for efficient computer data storage. More particularly, the data in the in-memory database resides in volatile memory and is not persistently stored on a hard drive, thereby allowing the data to be instantly accessed and scanned at a speed of several megabytes per millisecond.

Memory module 112 of the central computer system 106 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by CPU 110. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 of the central computer system 106 includes a training module 122, an error detection module 124 and an error correction module 126. Training module 122 may include a set of function modules or programs designed to train a confusion matrix for detecting and correcting errors in recognition data. Error detection module 124 may include a set of function modules or programs designed to detect errors in recognition data from sensors 158. Error correction module 126 may include a set of function models or programs designed to correct the errors detected by error detection module 124.

Sensors 158 may include one or more sensors (e.g., LPR sensors or cameras, RFID sensors, etc.) installed at one or more stations at predetermined locations (e.g., along key road segments). Sensors 158 may acquire and perform a recognition algorithm (e.g., LPR) on sensor data (e.g., images) to generate recognition data.

Central computer system 106 may act as a server and operate in a networked environment using logical connections to one or more client devices 156. Client device 156 may serve as user interface to enable a user to send and receive information (e.g., processing results) from computer system 106.

Figure 2:
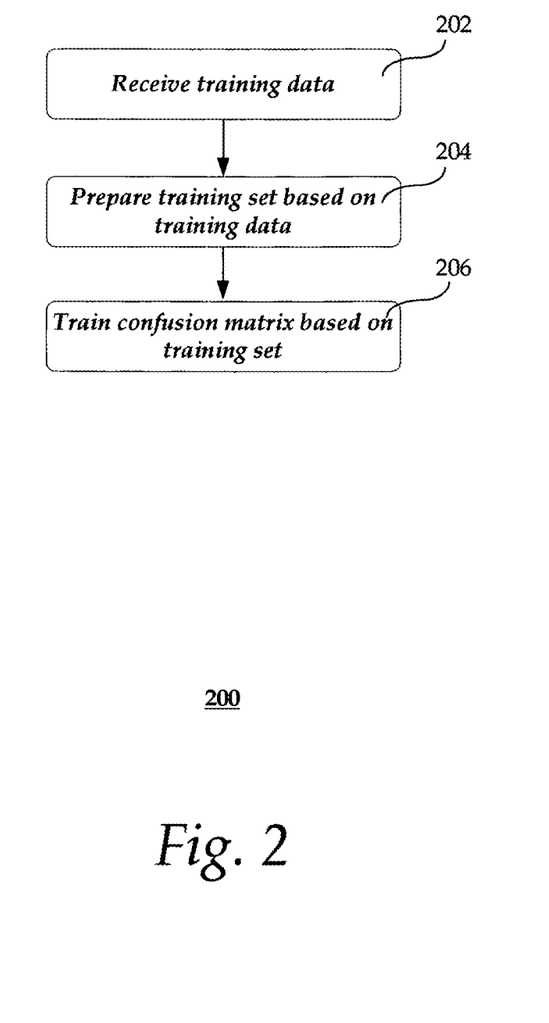
FIG. 2 shows an exemplary method of training a confusion matrix for error detection.

FIG. 2 shows an exemplary method 200 of training a confusion matrix for error detection. The method 200 may be performed automatically or semi-automatically by the central computer system 106, as previously described with reference to FIG. 1. It should be noted that in the following discussion, reference will be made, using like numerals, to the features described in FIG. 1.

At 202, training module 122 receives training data. The training data includes an input vector and an answer (or true) vector that can be used together to train the confusion matrix to automatically identify any error in recognizing one or more objects of interest (e.g., license plate registration identifier). The training data may be previously acquired and generated by sensors 158 and stored in data repository 118.

In some implementations, the training data includes recognition data associated with one or more sensors 158. Recognition data generally refers to records that store metadata that identify one or more objects of interest (e.g., vehicles) and is generated by a recognition algorithm (e.g., image processing algorithm) performed on sensor data (e.g., image data). For example, the recognition data may include license plate recognition (LPR) records that store recognized license plate registration identifiers (e.g., letters or numbers) and other metadata associated with vehicles. LPR records may be generated by one or more LPR sensors that recognized registration identifiers from images of license plates. Such LPR sensors may be installed at predetermined stations to acquire and process images of license plates when the vehicles pass through the stations. Other types of training data are also useful.

Technology other than an automatic recognition algorithm may be used to identify vehicles. In some implementations, the training data further includes identification data from one or more other separate sensors. Identification data generally refers to information that describes the object of interest (e.g., vehicles) and is directly read by the sensor without undergoing automatic recognition. The accuracy of error detection may be improved with the use of identification data from different sensors. Such identification data may be more reliable in identifying the object of interest than recognition data. However, devices that generate the identification data are typically not mandatory to install in the objects of interest, and the protocols are not unified among different cities or regions.

In some implementations, identification data includes radio frequency identification (RFID) data. RFID sensors may be used to read RFID data stored in RFID tags in the vehicles. RFID data may include electronically stored information associated with the vehicle, such as license plate registration identifier. In some implementations, RFID sensors are installed at the same stations as the LPR sensors. Accordingly, when a vehicle (e.g., car, truck, bus, etc.) equipped with an RFID tag passes through a station, its RFID data is recorded by the RFID sensor while the LPR data is recorded by the LPR sensor. It should be noted that only a small portion of vehicles may have an RFID tag onboard, and the majority of vehicles may only be tracked by LPR sensors.

At 204, training module 122 prepares training set based on training data. As discussed previously, the training data may include recognition data records, such as LPR records. Falsely recognized (or erroneous) LPR records often follow certain patterns under different LPR sensor operating conditions. For example, the letter "B" is often recognized as the number "8", and the letter "O" is often recognized as the letter "D" due to camera focal errors. In order to uncover such error patterns, a set of vehicle LPR records, where each "true" plate number is known, is collected as the training set. The set of LPR records may be specific to a particular LPR sensor. Different sets of vehicle LPR records may be collected for different LPR sensors. The training sets for all LPR sensors may thus be automatically constructed.

In accordance with some implementations, the training data includes only LPR records (without any identification data from other data sources). To build the training set, training module 122 identifies LPR records that are most likely to be erroneous (or falsely recognized) from the training data. Such erroneous LPR records may be detected based on predetermined abnormal patterns. An exemplary abnormal pattern is a one-time appearance of the record within a day. Such pattern assumes that if an LPR record only showed once for the whole day, the associated plate number is either falsely recognized or the vehicle showed up only once at the location of the LPR sensor. In the latter case, it is unlikely to find matching records nearby. Other abnormal patterns may also be used.

The identified erroneous LPR records are then paired with nearby matching LPR records that serve to provide the true values (e.g., registration identifiers). The nearby matching LPR records may be found by searching, according to a search criteria, among the LPR records acquired by sensors that are within a substantially close proximity of the sensor that had acquired the erroneous LPR record.

Figure 3A:
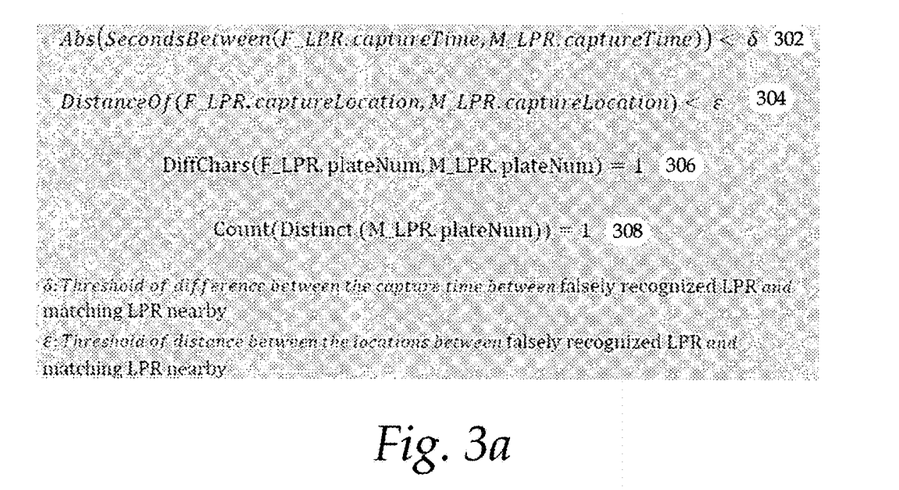
FIG. 3a illustrates an exemplary search criteria based on license plate recognition (LPR) records.

FIG. 3a illustrates an exemplary search criteria based on LPR records. The exemplary search criteria may include various conditions (302, 304, 306 and 308) that an LPR record needs to satisfy to qualify as a record that matches the erroneous (or falsely recognized) LPR record. The first exemplary condition 302 ensures that the erroneous LPR record and the matching LPR records are captured (or acquired) within a short predetermined time interval $\delta$. The second exemplary condition 304 guarantees that the erroneous LPR record and the matching LPR records are captured by neighboring sensors that are within a predetermined distance $\epsilon$. The threshold values $\delta$ and $\epsilon$ may be assigned different values in different cities, depending on the layout of the sensors. $\delta$ may be set to, for example, 60 minutes, and $\epsilon$ may be set to, for example, 10 kilometers. The third exemplary condition 306 finds all the matching records that are substantially similar to the erroneous LPR record. More particularly, the third exemplary condition 306 ensures that registration identifiers associated with the matching records and the erroneous LPR record differ in only one character. The last exemplary condition 308 guarantees that only one matching LPR record is found for the erroneous LPR record. If a matching LPR record is found, the detected erroneous LPR record and the matched LPR record are paired and included in the training set.

Figure 3B:
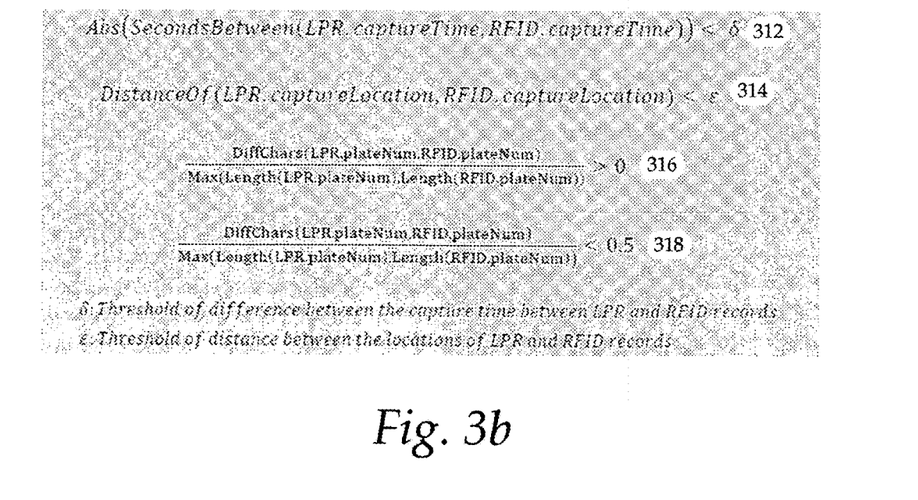
FIG. 3b shows an exemplary search criteria for building a training set based on LPR and radio-frequency identification (RFID) records.

In accordance with some implementations, the training data includes LPR records and identification data from another data source (e.g., RFID records). FIG. 3b shows an exemplary search criteria for building a training set based on LPR and RFID records. The first condition 312 guarantees that the LPR and RFID records are captured within a short time interval $\delta$. The second condition 314 ensures that the LPR and RFID records are captured by nearby sensors within a predetermined distance $\epsilon$ of each other. The thresholds $\delta$ and $\epsilon$ may be assigned different values in different cities, depending on the layout of the sensors. For example, $\delta$ may be set to 60 seconds and $\epsilon$ set to 100 meters. The third condition 316 filters out correctly recognized LPR records, which are associated with registration identifiers that are exactly the same as those in the identification data retrieved from the RFID record. The fourth condition 318 selects LPR records based on the assumption that if more than 50% of the characters in the license numbers are the same and in sequence between two adjacent LPR and RFID records after pre-filtering, the LPR record is erroneous and the license number from the corresponding RFID record may be used to provide the "true" value to correct the license number of the LPR record.

Returning to FIG. 2, at 206, training module 122 trains a confusion matrix based on the training set. Given the training set of LPR records paired with "true" values (e.g., vehicle license plate numbers), a confusion matrix may be constructed. The confusion matrix allows visualization of the performance of the recognition algorithm performed by the associated sensor on the LPR records. A similarity function may be separately trained from the confusion matrix. The confusion matrix is constructed to compare characters, while the similarity function is trained to compare two sequences of characters. Under different circumstances, the probability of one character being falsely recognized as another by the recognition algorithm is different for each sensor. The training process may be supervised at the beginning, but iteratively updated unsupervised based on the erroneous records and their corresponding actual records. More particularly, the training set may be manually selected at first. After the confusion matrix is trained and the recognition algorithm is able to pick out erroneous LPRs with higher accuracy, training samples may then be generated without human intervention (i.e., automatically). Eventually, convergence may be achieved when the confusion matrix does not change by much.

Figure 4:
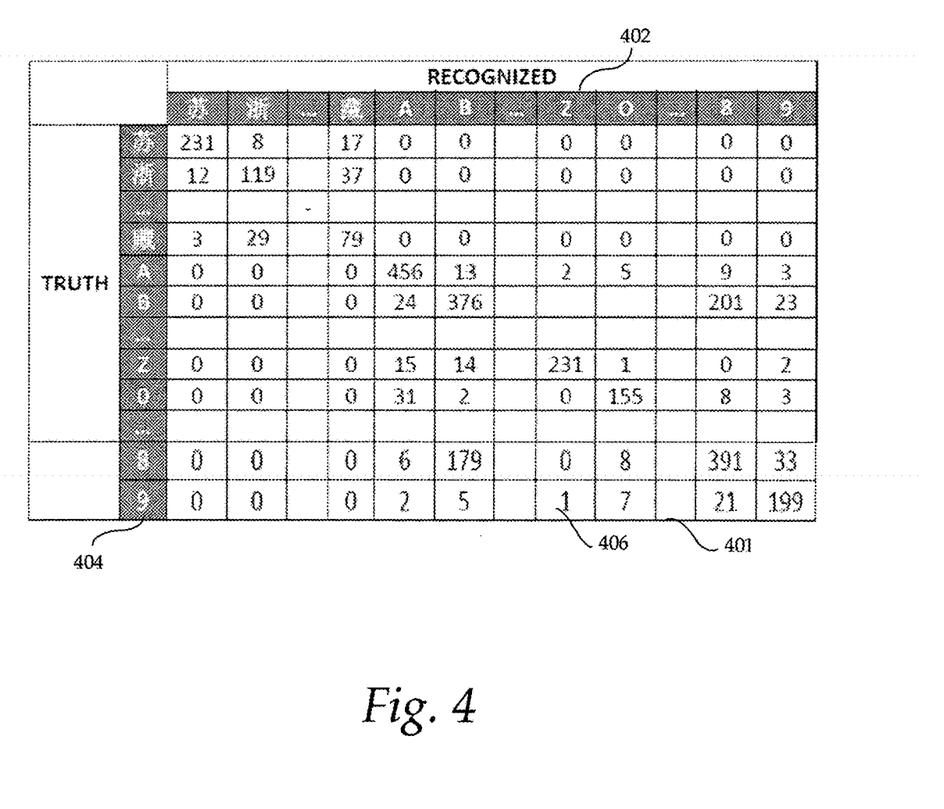
FIG. 4 shows an exemplary confusion matrix.

FIG. 4 shows an exemplary confusion matrix 401. The confusion matrix 401 is trained to represent all possible outcomes of each recognized character (e.g., a letter or a number) 402. More particularly, each column 402 of the matrix 401 represents the instances in a recognized class, while each row 404 represents the instances in a truth (or actual) class (or vice-versa). Each entry 406 in the confusion matrix 401 represents the probability of (or number of times) the sensor recognizing the character 404 as character 402. It is possible to construct such confusion matrices for each LPR sensor at different time stamps in various weather conditions to reflect different recognition patterns from different LPR sensors operating at different times of the day. In some implementations, one confusion matrix is maintained for each LPR sensor, which may be updated at a predetermined time interval (e.g., hourly). Such trained confusion matrix may then be used to detect and correct errors in recognition data.

Figure 5:
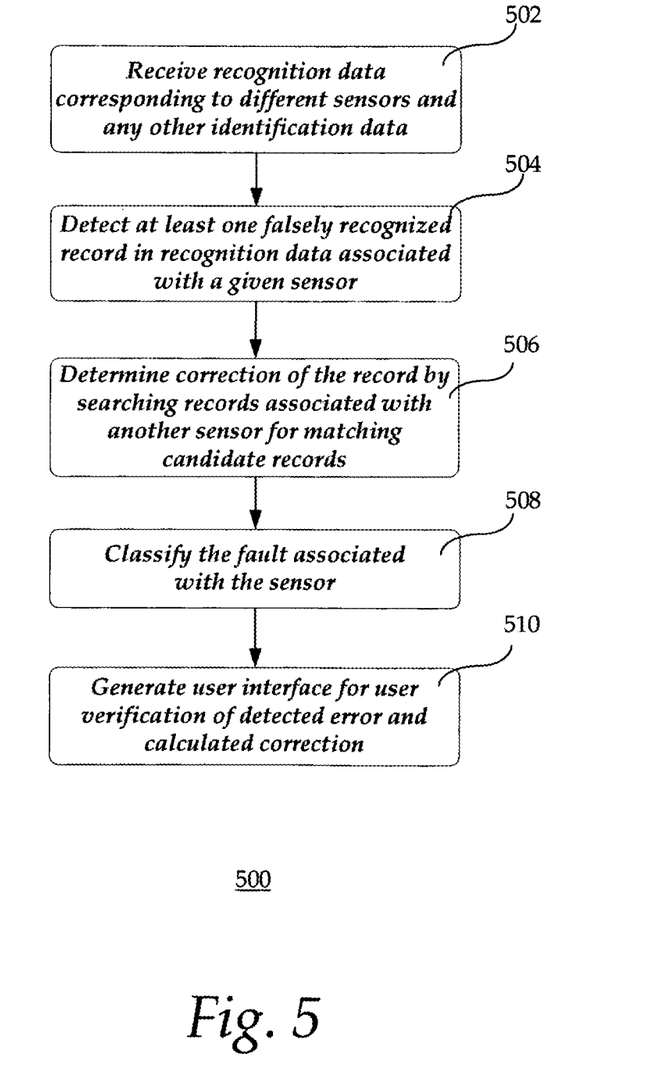
FIG. 5 shows an exemplary method of error detection and correction.

FIG. 5 shows an exemplary method 500 of error detection and correction. The method 500 may be performed automatically or semi-automatically by the central computer system 106, as previously described with reference to FIG. 1. It should be noted that in the following discussion, reference will be made, using like numerals, to the features described in FIG. 1.

At 502, error detection module 124 receives recognition data (e.g., LPR records) and any other identification data (e.g., RFID data) associated with one or more different sensors. The recognition data and identification data (if any) may be continuously acquired and stored by sensors 158 in, for example, data repository 118 (e.g., in-memory database for fast retrieval). In some implementations, vehicles are identified by performing automatic image recognition algorithm on images of their associated license plates as they pass through these stations. Each LPR record may include the recognized registration identifier, location of sensor, passing time, etc.

At 504, error detection module 124 detects at least one falsely recognized (or erroneous) record in recognition data associated with a given sensor. The recognition data may include, for example, LPR records acquired by a given LPR sensor within a day. The error detection may be performed based on a predetermined rule. For example, error detection module 124 may identify erroneous LPR records by searching, from the recognition data, for a record that is captured (or occurred) less than a predetermined threshold value µ (e.g., 2) in a predetermined time frame (e.g., 12 hours). The predetermined threshold value µ and time frame may be changed according to, for example, city size and traffic flow. This predetermined rule is based on the observation that since the number of possible registration identifiers is typically much larger than the actual number of registered vehicles in a given area, it is very unlikely for a vehicle with a falsely recognized registration identifier to be traveling on the same street on the same day as another vehicle with an actual registration identifier that is exactly the same. In addition, different sensors are unlikely to continuously falsely recognize one registration identifier as another. Accordingly, the occurrence (or capture) number of each registration identifier in a connected road network within a predetermined time frame provides the probability of recognition error. If the occurrence number within the time frame is less than a threshold value, this registration identifier is much likely to be falsely recognized.

At 506, error correction module 126 determines correction of the recognized identifier in the erroneous (or falsely recognized) record. The correction may be determined by searching in a set of recognition data associated with nearby sensors for a candidate record with a recognized identifier that is most similar to that of the erroneous record. The candidate record may be generated by another different nearby sensor shortly before or after the erroneous record is captured. The candidate record may then be used to generate a correction of the identifier for the erroneous record.

In some implementations, for each erroneous record associated with a given sensor, a set of matching candidate records is constructed by searching recognition data associated with nearby sensors for matching records. The search may be performed radially both spatially and temporally to find candidate records with the highest similarity scores, and which are not in set of erroneous records. More particularly, each matching candidate record may be acquired within a day from another different sensor and satisfies the following search criteria: (i) distance between the sensors that acquired the matching candidate record and the erroneous record is less than ε; (ii) the matching candidate record and the erroneous record are captured within a predetermined time interval δ; (iii) no more than 50% characters of the matching candidate record are different from the erroneous record (i.e., records are substantially similar); and (iv) the matching candidate record is not in the erroneous set. The matching candidate record may be used to correct errors in the erroneous record. The predetermined thresholds δ and ε may be assigned different values in different cities depending on, for example, the layout of sensors. δ may be set to 60 minutes and ε set to 10 kilometers.

Given an erroneous record, the similarity of the associated sequence of characters $s_i$ (e.g., letters and numbers of a registration identifier) with records in the matching candidate set may be determined. The probability of character $s_i$ being recognized as $w_i$ may then be calculated based on the confusion matrix.

Figure 6:
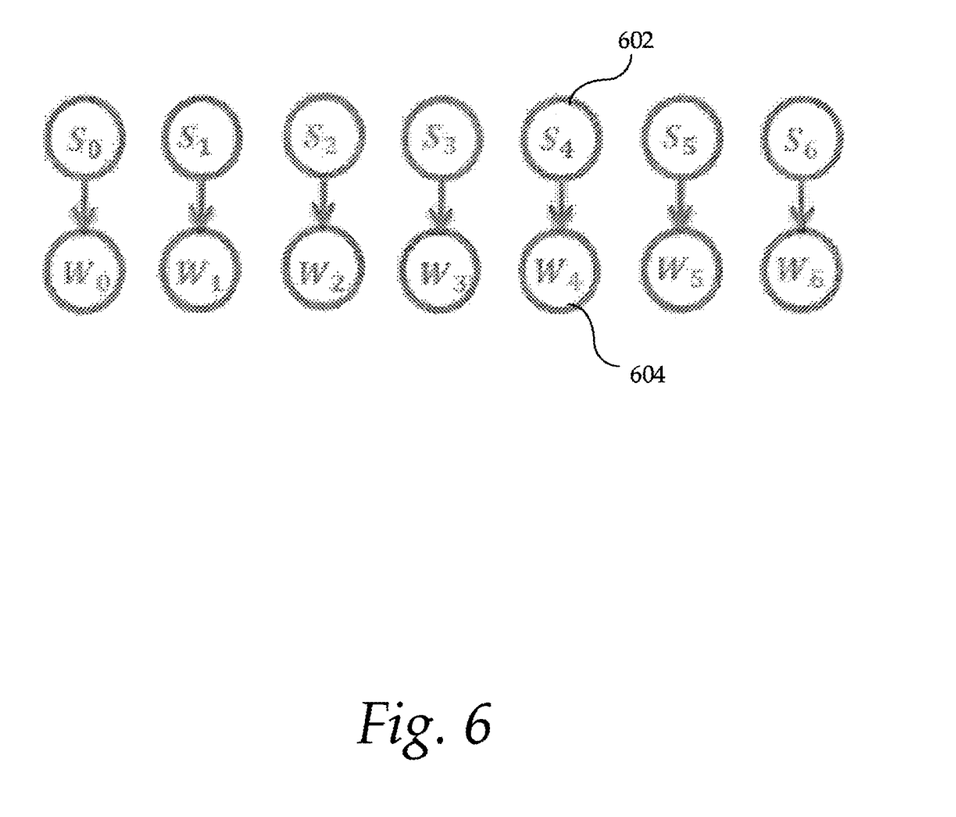
FIG. 6 shows an exemplary sequence of characters from a record in the candidate set and an exemplary sequence of characters associated with the erroneous record.

FIG. 6 shows an exemplary sequence of characters 602 from a record in the candidate set and an exemplary sequence of characters 604 associated with the detected erroneous record. The similarity of the two sequences of characters (602, 604) may be determined as follows:

$$P(s, w) = \prod_i P(w_i \mid s_i) \quad (1)$$

$$\text{wherein } P(w_i \mid s_i) = \frac{\text{Max}(\text{Count}(w_i \mid s_i), 1)}{\sum_j^n \text{Max}(\text{Count}(w_j \mid s_i), 1)} \quad (2)$$

and $s_i$ is the i-th character of the sequence s from one record in the candidate set, $w_i$ is the i-th character of the sequence w from a detected erroneous record, P is the similarity of sequences s and w, Count($w_i|s_i$) is the $(s_i|w_i)^{th}$ entry of a confusion matrix, n is the total number of potential characters or columns of a confusion matrix and j is the index. After the similarities of all matching candidates in the candidate set are computed, the candidate with the highest similarity may be selected and used to correct the erroneous record.

Returning to FIG. 5, at 508, error detection module 124 classifies the fault of the sensor associated with the erroneous record. The fault of the sensor may be classified into different types based on, for example, an error distribution pattern associated with the erroneous record. One or more types of error distribution patterns may be determined for each sensor for each day. The error distribution pattern may represent a spatial spread (e.g., lane distribution) or temporal spread (e.g., time distribution) of detected erroneous records. The faults associated with the sensor may then be classified to different types by extracting characteristics (e.g., evenly or unevenly distributed) of the error distribution patterns and applying one or more predetermined rules. The sensor fault may be classified into types caused by, for example, illumination anomaly, special weather (e.g., rain, fog, haze, snow, etc.), obstruction of camera view or sensor malfunctioning. Error detection module 124 may further generate a statistical failure report associated with each sensor. The statistical report contains, for example, failure statistics, in the above described scenarios.

Figure 7A:
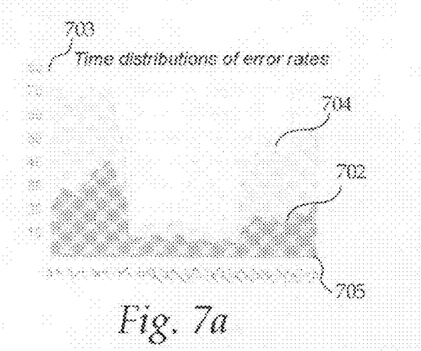
FIG. 7a shows exemplary time distributions.

FIG. 7a shows exemplary time distributions (702, 704) associated with a sensor. More particularly, time distribution 704 represents the rate of "falsely-recognized" errors, while time distribution 702 represents the rate of "falsely-recognized" and "un-recognized" errors. "Un-recognized" errors are the type of errors that arise when that the image recognition algorithm cannot determine and return any metadata from the LPR. "Un-recognized" plate numbers may be automatically labelled by the sensor itself. The vertical axis 703 represents the error percentage rate (e.g., 70% means 70 errors detected in 100 records), while the horizontal axis 705 represents the different times of the day (e.g., 0-24 hours).

Figure 7B:
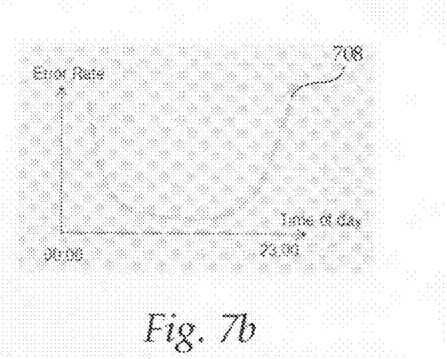
FIG. 7b shows an exemplary U-shaped pattern.
Figure 7C:
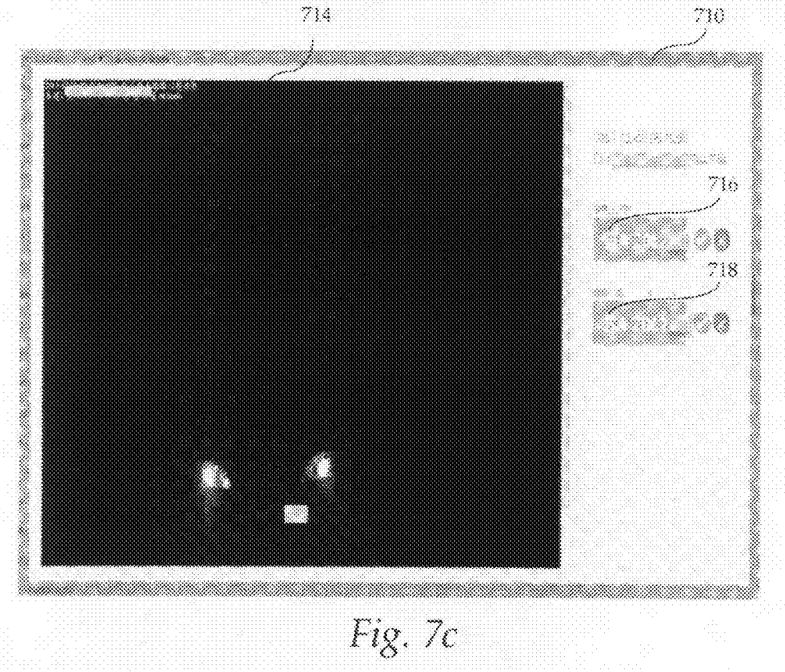
FIG. 7c shows an exemplary user interface screenshot.

FIG. 7b shows an exemplary U-shaped pattern 708 that fits the time distributions 702 and 704. This pattern 708 may be used to classify the fault as one that is due to illumination problems, because the error rate is much higher at night than during the day. It should be appreciated that other patterns may also be used for classification. FIG. 7c shows an exemplary user interface screenshot 710. The screenshot 710 displays an LPR image 714 in which there is a lack of illumination. The user may view this image 714 to verify the classification of the fault. In addition, the erroneous registration identifier 716 and the suggested corrected registration identifier 718 may be displayed to allow the user to verify or choose the correct number.

Figure 8A:
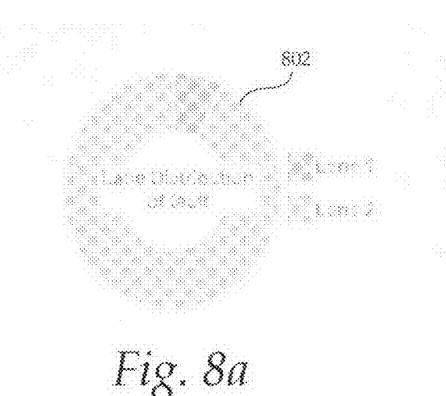
FIG. 8a shows an exemplary lane distribution.
Figure 8B:
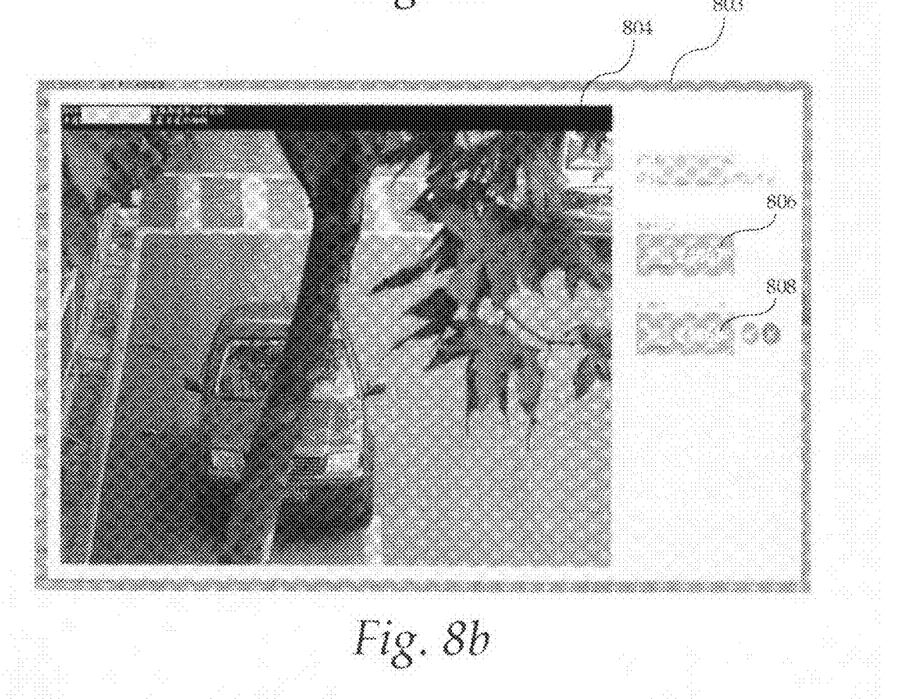
FIG. 8b shows an exemplary user interface screenshot.

FIG. 8a shows an exemplary lane distribution 802. The lane distribution 802 illustrates the number of faults found in different lanes. In this example, the lane distribution is unevenly spread across lanes 1 and 2 (i.e., more errors detected in lane 2 than lane 1). If the time distribution is even (e.g., not U-shaped) but the lane distribution is uneven, the fault may be classified as obstruction of camera view by one or more objects. FIG. 8b shows an exemplary user interface screenshot 803. The screenshot 803 displays an LPR image 804 in which the camera view is obstructed by a tree. The user may view this image 804 to verify the classification of the fault. In addition, the erroneous registration identifier 806 and the suggested corrected registration identifier 808 may be displayed to allow the user to verify or choose the correct number.

Returning to FIG. 5, at 510, error detection module 124 generates a user interface for user verification of the detected error and calculated correction. The user interface may be presented (or displayed) via client device 156. Users, such as operators responsible for maintaining the sensors, may view and interact with the user interface via client device 156. The user interface may present, for example, a daily report of the status of each camera station and associated sensors. The user interface may also enable the user to verify the classification of fault of each sensor by viewing, for example, all license plate images associated with the erroneous LPR record and compare them with the correction determined by the present framework.

Figure 9:
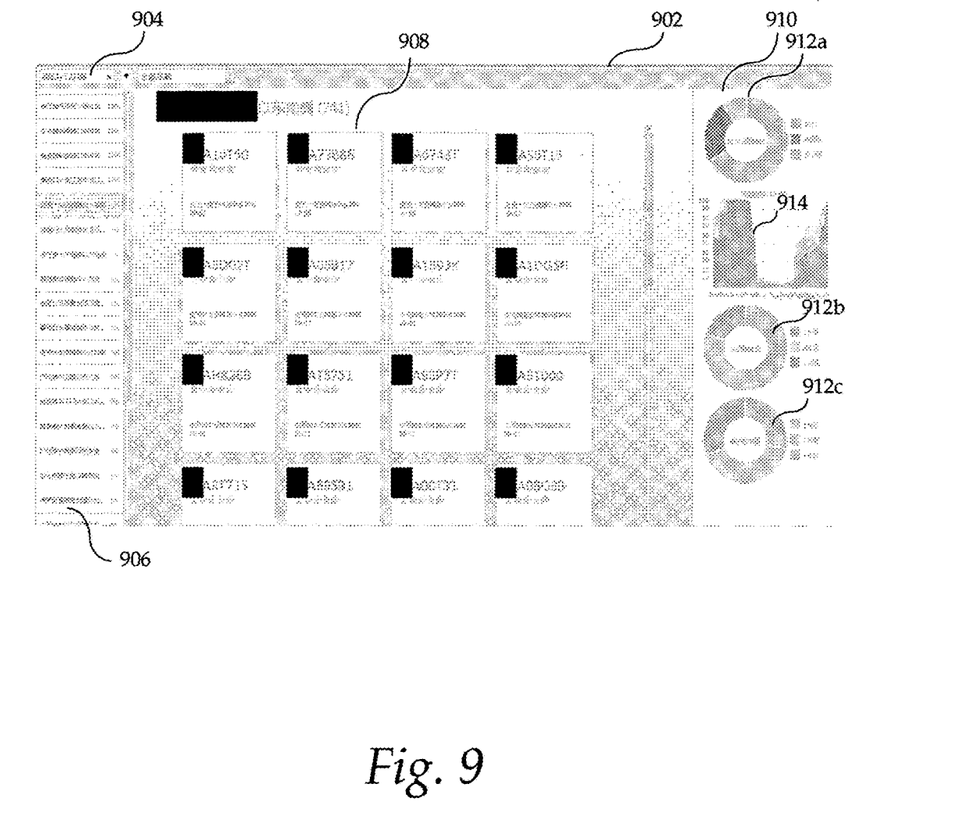
FIG. 9 shows an exemplary user interface screenshot.

FIG. 9 shows an exemplary user interface screenshot 902. The user interface includes an upper panel 904, a left panel 906, a central panel 908 and a right panel 910. Upper panel 904 enables the user to pick a particular day (or date) to inspect. Left panel 906 displays a list of sensors ordered by the error rate calculated by the present framework. The user may select one of the displayed sensors for further inspection. Central panel 908 presents an array of erroneous LPR records and suggested corrections determined by the present framework of the selected sensor. The user may select one of the displayed records for inspection and verification. Right panel 910 displays lane distributions 912a-c. Lane distribution 912a represents proportions of un-recognized, falsely-recognized and other types of errors; lane distribution 912b represents proportions of unrecognized errors; and lane distribution 912c represents proportions of falsely-recognized errors.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A system for error detection, comprising:
 a non-transitory memory device for storing computer-readable program code; and a processor in communication with the memory device, the processor being operative with the computer-readable program code to perform operations comprising:
  preparing a training set based on at least a first set of recognition data associated with a first sensor, wherein the first set of recognition data comprises records that store recognized identifiers associated with vehicles,
  training a confusion matrix based on the training set,
  detecting at least one erroneous record in a second set of recognition data associated with the first sensor wherein the second set of recognition data comprises records that store recognized identifiers associated with the vehicles, and
  determining correction of the erroneous record by comparing similarity with records associated with other sensors using the trained confusion matrix;
 wherein:
  the training set is prepared by:
   identifying, based on at least one predetermined abnormal pattern, an erroneous record from the first set of recognition data that is likely to be falsely recognized, the at least one predetermined abnormal pattern specifying a pre-determined frequency for a record within a pre-determined amount of time; and
  pairing the identified erroneous record with a nearby matching record that provides a true value;
   the nearby matching record is identified using a search criteria that ensures that the erroneous record and the matching record are captured within a predetermined time interval, the erroneous record and the matching record are captured by sensors that are within a predetermined, yet geographically disparate distance along key road segments, and the erroneous record and the matching record are substantially similar.

2. The system of claim 1 wherein the predetermined abnormal pattern comprises a one-time appearance of the erroneous record within a day.

3. The system of claim 1 wherein the processor is operative with the computer-readable program code to prepare the training set further based on identification data associated with a second sensor.

4. The system of claim 3 wherein the identification data comprises radio frequency identification data associated with the vehicles.

5. The system of claim 3 further comprising multiple sensors in communication with the processor and the memory device that acquires the first and second sets of recognition data and the identification data.

6. The system of claim 3 wherein the processor is operative with the computer-readable program code to prepare the training set by identifying, based on the at least one predetermined abnormal pattern, an erroneous record from the first set of recognition data that is likely to be falsely recognized; and pairing the identified erroneous record with an identification data record that provides a true value.

7. The system of claim 6 wherein the processor is operative with the computer-readable program code to search for the identification data record based on a search criteria that ensures that the erroneous record and the identification data record are captured within a predetermined time interval, the erroneous record and the identification data record are captured by sensors that are within a predetermined distance, the erroneous record and the identification data record are associated with identifiers that are not exactly the same.

8. A computer-implemented method for error detection comprising:
  preparing a training set based on at least a first set of recognition data associated with a first sensor capturing optical images and a set of identification data associated with a second sensor capturing Radio Frequency Identification (RFID) data, wherein the first set of recognition data comprises records that store recognized identifiers associated with vehicles,
training a confusion matrix based on the training set,
detecting at least one erroneous record in a second set of recognition data associated with the first sensor wherein the second set of recognition data comprises records that store recognized identifiers associated with the vehicles, and
determining correction of the erroneous record by comparing similarity with records associated with other sensors using the trained confusion matrix;
wherein:
  the training set is prepared by:
    identifying, based on at least one predetermined abnormal pattern, an erroneous record from the first set of recognition data that is likely to be falsely recognized, the at least one predetermined abnormal pattern specifying a pre-determined frequency for a record within a pre-determined amount of time; and
  pairing the identified erroneous record with a nearby matching record that provides a true value;
  the nearby matching record is identified using a search criteria that ensures that the erroneous record and the matching record are captured within a predetermined time interval, the erroneous record and the matching record are captured by sensors that are within a predetermined, yet geographically disparate distance along key road segments, and the erroneous record and the matching record are substantially similar.

* * * * *